United States Patent
Kaminow et al.

[11] B 3,990,775
[5] Nov. 9, 1976

[54] THIN-FILM OPTICAL WAVEGUIDE

[75] Inventors: Ivan Paul Kaminow, New Shrewsbury; Herwig Werner Kogelnik, Fair Haven, both of N.J.

[73] Assignee: Bell Telephone Laboratories, Incorporated, Murray Hill, N.J.

[22] Filed: July 23, 1973

[21] Appl. No.: 381,985

[44] Published under the second Trial Voluntary Protest Program on February 3, 1976 as document No. B 381,985.

[52] U.S. Cl. .................. 350/96 WG; 350/160 R
[51] Int. Cl.² .............................. G02B 5/14
[58] Field of Search ............. 350/96 WG, 160 R

[56] References Cited
UNITED STATES PATENTS

| | | | |
|---|---|---|---|
| 3,537,020 | 10/1970 | Anderson | 350/96 WG X |
| 3,795,433 | 3/1974 | Channin | 350/96 WG |
| 3,795,434 | 3/1974 | Ash | 350/96 WG |

OTHER PUBLICATIONS

Noda et al., "A Novel Optical Waveguide for Integrated Optics" *Digest of Technical Papers, 1973 IEEE/OSA Conference on Laser Engineering Applications*, May 30–June 1, 1973, p. 67.

*Primary Examiner*—John K. Corbin
*Attorney, Agent, or Firm*—Lucian C. Canepa

[57] ABSTRACT

It is known to form an optical waveguiding thin film on a substrate. For various practical reasons, it is often desired that an optical beam coupled to the film be laterally confined so as to propagate only in a longitudinal stripe portion of the film. As disclosed herein, this is accomplished by depositing a material on a selected portion of the film surface to establish in a narrow longitudinal region of the film an effective index of refraction that is higher than the index of the remainder of the film. In this way a longitudinal waveguiding stripe is formed in the film without the necessity of irradiating, etching or otherwise directly treating the film itself.

2 Claims, 6 Drawing Figures

THIN-FILM OPTICAL WAVEGUIDE

BACKGROUND OF THE INVENTION

This invention relates to optical signal processing and, more particularly, to a thin-film optical waveguide formed in an integrated optical structure.

Integrated optics is a recently developed technology in which thin-film techniques are applied to the fabrication of miniature compact optical devices. Due to their small size, rugged and reproducible construction, and low-cost potential, such devices are attractive candidates for inclusion in high-capacity optical communication systems.

For an overview of the field of integrated optics, see, for example, a "Survey of Integrated Optics" by S. E. Miller, *IEEE Journal of Quantum Electronics*, Vol. QE-8, No. 2, February 1972, pp. 199–205.

Techniques are known for producing a planar thin-film optical waveguiding layer on a supporting substrate material. In a planar waveguide of this type there is no optical beam spreading normal to the plane of the layer, but diffraction in the plane causes the beam to increase in width as it propagates along the film.

For some applications of practical interest, it is desired to limit the waveguiding portion of the layer to a longitudinal stripe. By so limiting the lateral extent of the optical beam, efficient modulators and other components needed to construct an optical communication system may be more easily realized. Moreover, the longitudinal stripe geometry facilitates the transfer of optical power from the thin-film structure to an associated optical fiber transmission line.

A longitudinal stripe waveguiding region may be formed in a planar film in a number of ways. For example, such a region may be formed by selectively irradiating the film through a mask. Or, by using standard photolithographic techniques, all but one or more guiding stripes of the film may be partially or completely etched away.

In some applications the known ways of forming a waveguiding stripe in a film are satisfactory. But in others they are not, due either to degradation of the properties of the stripe arising from the stripe-formation process or to the practical difficulty of forming the stripe in a particular materials system.

SUMMARY OF THE INVENTION

An object of the present invention is an improved thin-film optical waveguide.

More specifically, an object of this invention is a longitudinal waveguiding stripe formed in a planar thin film without the necessity of irradiating, etching or otherwise directly processing the film itself.

Briefly, these and other objects of the present invention are realized in a specific illustrative embodiment thereof that comprises a longitudinal stripe of a dielectric material deposited on the top surface of a planar waveguiding thin film. The index of refraction of the deposited stripe is chosen to be less than that of the thin film but greater than that of the ambient medium. The deposited stripe causes the effective refractive index of the region of the thin film directly underlying the stripe to be higher than the index of the film in other regions. As a result, waveguiding is limited to the noted underlying region.

In a second specific illustrative embodiment a metallic layer is deposited on the entire top surface of the aforementioned thin film except for a longitudinal stripe region. The portion of the thin film underlying the metal-less region exhibits an effective refractive index higher than the rest of the film. Accordingly, waveguiding takes place in that portion of the film.

BRIEF DESCRIPTION OF THE DRAWING

A complete understanding of the present invention and of the above and other objects thereof may be gained from a consideration of the following detailed description presented hereinbelow in connection with the accompanying drawing in which.

DETAILED DESCRIPTION

Figure 1:
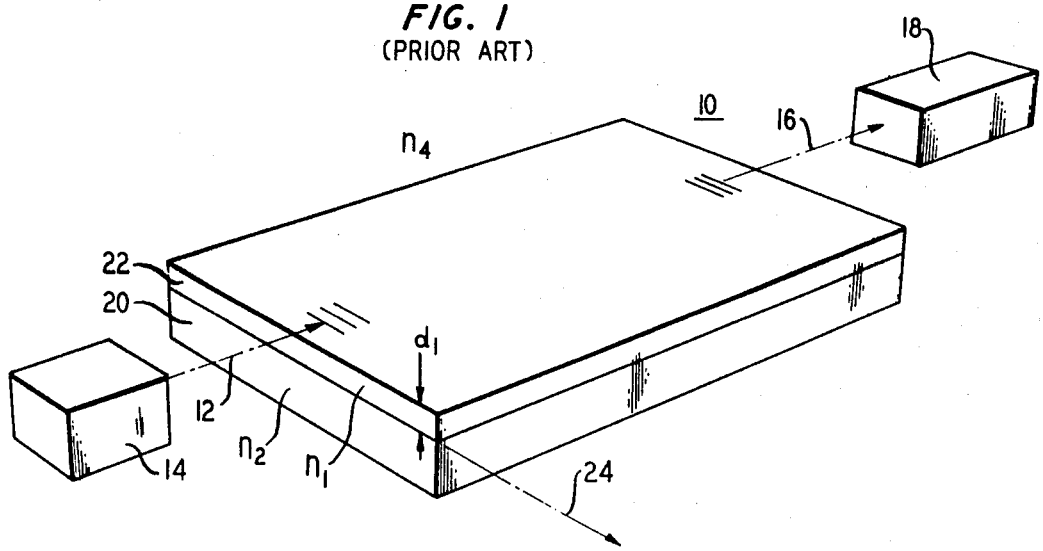
FIG. 1 shows a prior art thin-film optical waveguide.

FIG. 1 is a pictorial illustration of a prior art integrated-optics device 10. The device 10 is positioned in the path of incident radiation (represented by dashed line 12) supplied by a light source 14. The radiation is typically coherent with wavelength(s) in the optical range (which includes visible and near visible wavelengths) and may be provided by any suitable source, for example a laser. Any portion of the incident beam that is transmitted through the device 10 is directed along an output path (indicated by dashed line 16) to impinge upon a utilization device 18 that comprises, for example, a conventional photodetector. In some applications of practical interest an optical fiber may be utilized to directly couple the devices 10 and 18.

The prior art device 10 of FIG. 1 includes a substrate 20 on which a thin film 22 of an electro-optic dielectric material is deposited. It is known that for the film 22 to support propagating optical modes and to act as a waveguide for light waves, the refractive index $n_1$ of the film 22 must be greater than the index $n_2$ of the substrate 20. Both of the indices are assumed to be greater than the refractive index $n_4$ of the air space above the device 10. If desired, a suitable covering layer (not shown) having an index of refraction less than that of the guiding film 22 may be deposited on the device to protect its upper surfaces and/or to provide a symmetrical guiding structure. The substrate 20 may, for example, be made of glass, with a suitable waveguiding layer or stripe of electro-optic material deposited on the substrate. But for purposes of a specific example herein it will be assumed that the substrate is instead made of $LiNbO_3$ which is an electro-optic material. Illustratively, the substrate is oriented such that the c axis of the $LiNbO_3$ cyrstal is parallel to vector 24 shown in FIG. 1.

For a $LiNbO_3$ substrate, an optical waveguiding layer may be formed thereon by out-diffusion. The selective out-diffusion of $Li_2O$ in a substrate of $LiTaO_3$ or $LiNbO_3$ to form a surface guiding layer is disclosed in a commonly assigned application, namely, J. R. Carruthers-I. P. Kaminow application Ser. No. 324,884, filed Jan. 18, 1973 now U.S. Pat. No. 3,837,827. Alternatively, a waveguiding layer may be formed on the substrate 20 by epitaxially depositing a higher-index layer thereon.

Illustratively, the film 22 has a thickness $d_1$ approximating the wavelength of the radiation to be propagated therein, so that the radiation is effectively confined in the thickness dimension by the dielectric discontinuities provided by the major surfaces of the film, that is, the substrate-to-film and air space-to-film interfaces. For the purposes of this invention the thickness of the film may be anywhere within the range of 0.1 to 100 times the wavelength to be propagated as measured in the waveguide, but is preferably between 1 and 10 times the wavelength.

In such a planar waveguiding structure, as mentioned above, there is no beam spreading normal to the plane but diffraction of the beam in the plane will occur. To limit such diffraction, formation of a higher-index layer may be restricted to a longitudinal-stripe surface region of the substrate. Or, after forming a higher-index layer 22 on the entire top surface of the substrate 20, all or part of that layer except a narrow stripe may be selectively removed by etching or ion milling or other techniques. In these ways waveguiding action may be limited to a stripe in the device 10. But, as indicated earlier above, these known ways of limiting the lateral extent of the waveguiding portion of the layer 22 are sometimes not satisfactory.

Radiation supplied by the source 14 may be introduced into and extracted from the film 22 of the device 10 in any one of a variety of ways known in the art. For example, prism couplers of the type described in Applied Physics Letters, Vol. 14, page 291 (1969), may be utilized for that purpose. Advantageously, in applications in which miniaturization, ruggedness and simplicity are important, optical coupling and decoupling are accomplished by means of optical diffraction gratings formed directly on the surface of the guiding film 22 so as to be structurally integral therewith. Such couplers, which are, for example, described in A. Ashkin-E. P. Ippen U.S. Pat. No. 3,674,335, issued July 4, 1972, can be constructed to exhibit coupling efficiencies of better than 70 percent.

For illustrative purposes, gratings 35 and 37, each depicted as a series of parallel lines, are respectively utilized in the prior art FIG. 1 device to couple optical waves into and out of the waveguiding film 22.

Figure 2:
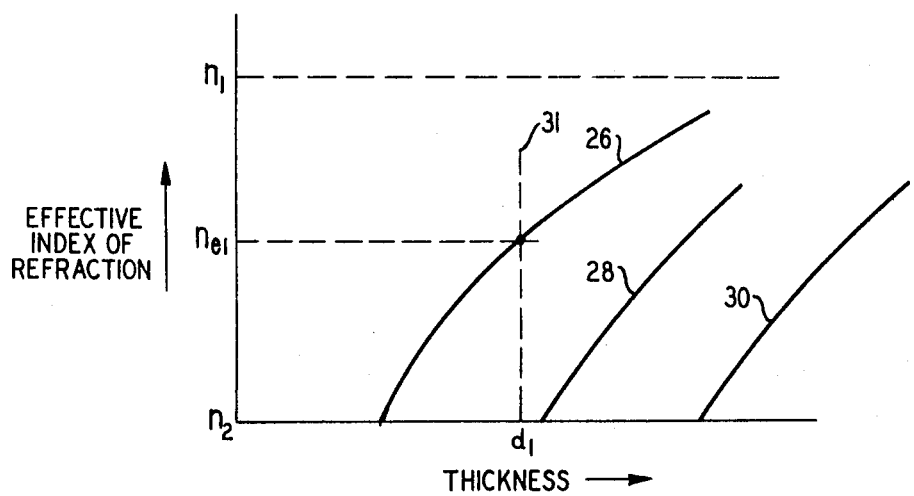
FIG. 2 is a graph associated with the FIG. 1 structure.

FIG. 2 is a plot of the effective index of refraction "seen" by an optical wave in the course of propagating through the device 10 versus the thickness of the waveguiding layer 22 of FIG. 1. Curve 26 designates the fundamental TE mode capable of being transmitted through the device 10, and curves 28 and 30 are representative of higher-order modes. For a particular selected thickness, the corresponding effective index or indices are determined by the intersection between the depicted curve(s) and a vertical line at the selected thickness. For the thickness $d_1$ only a single such intersection occurs (determined by line 31 and curve 26). In other words, only the fundamental mode propagates in the layer 22 and no higher-order modes are supported thereby. For that case the effective index of refraction of the depicted structure is $n_{el}$.

Figure 3:
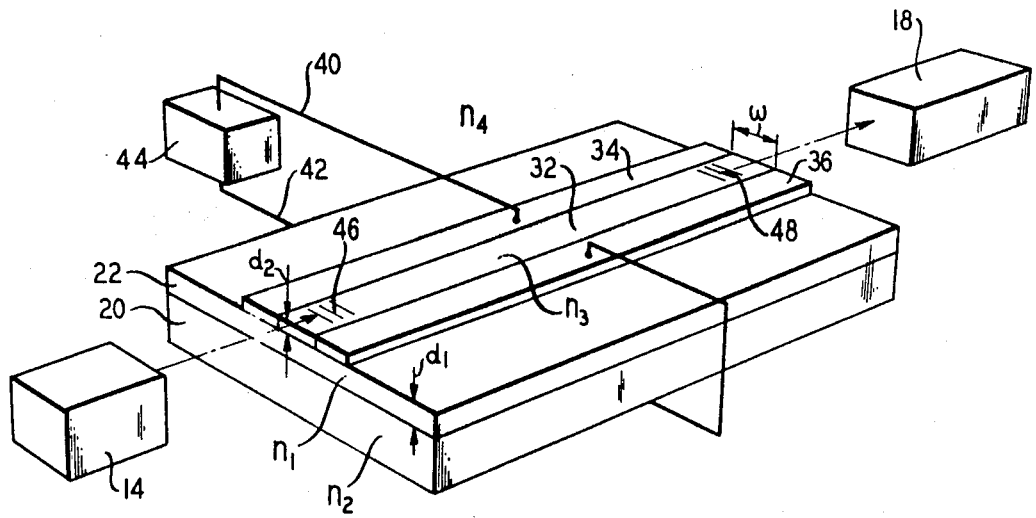
FIG. 3 depicts a specific illustrative embodiment made in accordance with the principles of the present invention.

In accordance with the principles of the present invention the structure of FIG. 1 is modified by adding thereto a longitudinal stripe 32, as shown in FIG. 3. (Assume for the time being that longitudinal electrodes 34 and 36 shown in FIG. 3 are not present.) The stripe 32 comprises a dielectric material whose index of refraction $n_3$ is selected to be greater than the index $n_4$ of the ambient medium (for example, air) but less than the index $n_1$ of the waveguiding region 22. In principle, it is immaterial whether $n_3$ is equal to, greater than, or less than the index $n_2$ of the substrate 20. However, the stripe material will have greater influence on the effective index of refraction if $n_3$ is greater than $n_2$.

For the particular case in which both the substrate 20 and the layer 22 of FIG. 3 comprise lithium niobate, the stripe 32 may, for example, be made of sputtered glass, silicon dioxide, a photoresist such as Kodak KPR or poly-methyl-methacrylate. Illustratively, the width $w$ of the stripe 32 is in the order of a wavelength of the light to be guided by the depicted structure. For wavelengths of practical interest this width approximates 1 to 100 micrometers. The thickness $d_2$ of the stripe 32 is not critical but as a practical matter is usually made to be of the same order of magnitude as the aforenoted width.

The stripe 32 of FIG. 3 may be deposited, coated or otherwise placed on the layer 22 in any of a variety of ways known in the art. Illustratively, the stripe is formed photolithographically using a mask and photoresist.

Figure 4:
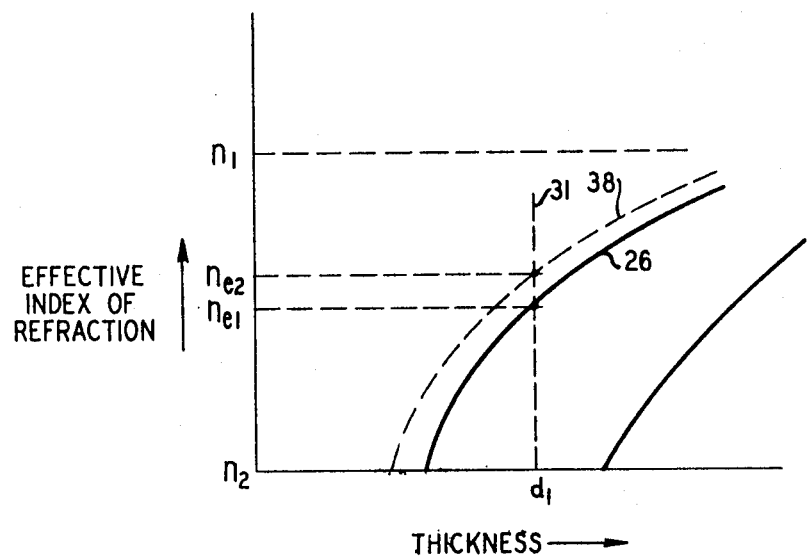
FIG. 4 is a graph useful in describing the waveguiding action of FIG. 3.

FIG. 4 is useful in understanding the effect that the stripe 32 exerts on the waveguiding layer 22 of FIG. 3. Assume that the layer 22 of FIG. 3 is identical to the correspondingly numbered layer shown in FIG. 1 and represented in FIG. 2. In that case those portions of the layer 22 of FIG. 3 whose top surfaces are bounded by the medium having refractive index $n_4$ also exhibit the aforementioned effective index designated $n_{el}$. This is determined by the intersection in FIG. 4 between vertical line 31 and curve 26.

The curve 26 of FIG. 4 is representative only of those portions of the layer 22 of FIG. 3 bounded by the medium having refractive index $n_4$. That portion of the layer 22 directly underneath the stripe 32 is bounded by a material whose refractive index is greater than $n_4$, as specified above. The applicable fundamental-mode curve for the layer 22 underlying this higher-index medium is shown in FIG. 4 as dashed-line curve 38. Hence, the corresponding effective index of refraction $n_{e2}$ for this underlying portion of the layer 22 is seen in FIG. 4 to be greater than $n_{el}$.

Thus, the presence of the stripe 32 of FIG. 3 is effective to create in the layer 22 a localized portion having a relatively high effective refractive index. As a result, an applied optical wave is guided in the layer 22 within the region directly underlying the stripe 32. In effect, lateral boundaries are formed in the layer 22 without introducing any processing discontinuities therein. As indicated above, these boundaries define a region in the layer 22 having a width $w$.

It is emphasized that waveguiding takes place in a localized portion of the layer 22 of FIG. 3 and not in the stripe 32 itself, although a small fraction of the light beam does extend into the stripe and beyond the width $w$ in the layer 22. Hence, any processing discontinuities (for example, edge roughness) or degradation of the properties of the stripe material introduced during fabrication have no substantial deleterious effect on the characteristics of the waveguiding portion.

As specified above, the waveguiding region in the layer 22 is defined by the overlying stripe 32. Accordingly, a variety of waveguiding path configurations, including both straight and curved sections, may be easily induced in a conventional planar waveguiding layer. In this way the fabrication in integrated-optics form of channel dropping filters, directional-coupler-type hybrids, switches and other devices is facilitated.

By adding longitudinally extending electrodes 34 and 36 to the FIG. 3 structure, a phase modulator may be thereby constructed. These electrodes may, for example, be formed by evaporating a layer of a suitable conductor such as aluminum onto the surface of the layer 22 directly adjacent the respective sides of the stripe 32. In turn, leads 40 and 42 respectively connect the spaced-apart stripe electrodes 34 and 36 to a variable voltage source 44.

Illustratively, optical signals are coupled to and extracted from the FIG. 3 device by means of gratings 46 and 48 which are formed directly on the top surface of the stripe 32. Signals applied to the grating 46 are coupled into the aforementioned localized portion of the layer 22 to propagate along the longitudinal extent thereof. Near the output end of the layer 22 the signals are coupled to the grating 48 and thence directed at the utilization device 18.

Alternatively, conventional prism couplers may be positioned on the stripe 32 of FIG. 3 at or near the respective ends of the stripe for carrying out the aforementioned input-output coupling. Or an optical beam may be focused into the front or input edge of the layer 22 directly underlying the stripe 32. Moreover, instead of using an output grating or prism, it may be advantageous to couple signals out of the structure by butting one end of an optical fiber transmission line against the back or output edge of the waveguiding portion of the layer 22.

Figure 5:
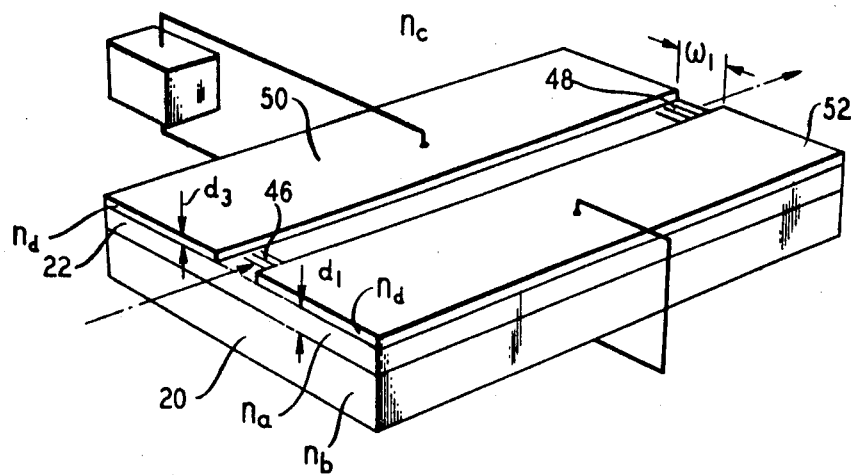
FIGS. 5 and 6 each show another specific illustrative embodiment of the invention.

A second specific illustrative embodiment made in accordance with the principles of the present invention is depicted in FIG. 5. The substrate and planar waveguiding layer of the FIG. 5 structure may, for example, be identical to the corresponding elements previously described above. Accordingly, the same reference numerals 20 and 22, respectively, are employed therefor in FIG. 5.

Deposited on the top surface of the layer 22 of FIG. 5 are two layers 50 and 52. The layers 50 and 52, which illustratively are each made of the same material (whose nature is specified below), serve to define therebetween an uncoated region of the layer 22 within which waveguiding action is to be confined. In practice, the width $w_1$ of the uncoated region between the layers 50 and 52 approximates 1 to 100 micrometers. The thickness $d_3$ of the layers 50 and 52 is not critical. This thickness may, for example, be about 0.1 to 1 micrometers.

The material of the layers 50 and 52 of FIG. 5 is selected to be one whose index of refraction $n_d$ is a complex number. More specifically, $n_d^2$ is of the form
$$A + iB$$
where A is a negative real number. Many metals exhibit such a complex refractive index at visible wavelengths. Alternatively, the layers 50 and 52 may be made of a semiconductive or dielectric material which at the wavelength(s) being propagated in the depicted structure is at or near an electronic or lattice resonance. In that region such materials also exhibit a complex refractive index of the required form.

In accordance with the present invention, the respective refractive indices $n_a$ and $n_b$ of the layers 22 and 20, the refractive index $n_c$ of the ambient medium, and the refractive index $n_d$ of the layers 50 and 52 are selected to satisfy the following relationships:

$n_a^2 > n_b^2$, $n_a^2 > n_c^2$, $n_a^2 > A$, and $n_c^2 > A$.

(The stripe guiding effect will be greater, the larger the ratio $n_a/n_b$.)

For a particular illustrative case in which the substrate 20 and the layer 22 of FIG. 5 are both lithium niobate and in which the ambient medium is air, the layers 50 and 52 may, for example, be made of aluminum or silver thereby to satisfy the above-specified relationships.

Alternatively, the substrate 20 may be made of glass, the layer 22 may be a plastic polymer such as a suitable photoresist, and the layers 50 and 52 may be made of silver.

The effect of the aforementioned layers 50 and 52 is to cause those portions of the layer 22 directly thereunder to exhibit a lower effective refractive index than that in the uncovered portion of the layer 22. Accordingly, waveguiding is confined to the uncovered portion of the layer 22. In particular, waveguiding takes place in a narrow longitudinal stripe region of the layer 22. As indicated in FIG. 5, this waveguiding stripe has a width $w_1$ and a thickness $d_1$.

An advantage of the FIG. 5 structure is that in those embodiments thereof wherein the layers 50 and 52 are conductive and the layer 22 is an electro-optic material, no additional elements need be added thereto to form a modulator of the type represented in FIG. 3. The overlying layers 50 and 52 themselves serve as longitudinally extending electrodes by means of which a variable electric field may be established in the waveguiding portion of the layer 22.

By selectively depositing surface layers of the type shown in FIG. 5, straight or curved waveguiding channels may in effect be formed in the underlying layer 20.

Figure 6:
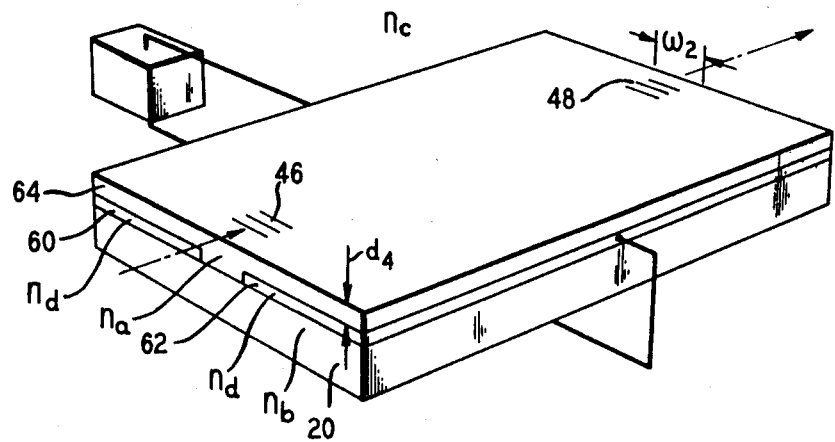

Alternatively as depicted in FIG. 6, layers 60 and 62 having the aforespecified refractive index $n_d$ may be first deposited directly on the substrate 20. In that case a waveguiding film 64 having a refractive index $n_a$ is deposited on the substrate 20 between the layers 60 and 62 as well as on top of the layers 60 and 62. As before, if the indicated relationships among the specified refractive indices are satisfied, the effect of the layers 60 and 62 is to confine waveguiding to a limited region of the film 64. In particular, waveguiding occurs in the film 64 in a region thereof having a width $w_2$ and a thickness $d_4$. As seen in FIG. 6, this waveguiding region lies directly above the gap between the layers 60 and 62. Illustratively, the thickness of the $n_d$ layers 60 and 62 is much less than the thickness of the guiding layer 64.

It is to be understood that the various above-described arrangements are only illustrative of the application of the principles of the present invention. In accordance with these principles, numerous other low-loss easily fabricated arrangements may be devised by those skilled in the art without departing from the spirit and scope of the invention. For example, the pairs of layers 50, 52 and 60, 62 respectively shown in FIGS. 5 and 6 may be combined in a single structure in which a waveguiding thin film is sandwiched between deposited pairs of such layers.

What is claimed is:

1. In combination, a planar dielectric thin-film waveguiding layer, passive means in contact with one surface of said layer for defining a said layer a region having an effective index of refraction that is higher than that in the other regions of said layer whereby waveguiding in said planar layer is confined to said defined region, wherein said passive means comprises a single longitudinal dielectric stripe element deposited on a portion of the top surface of said layer directly overlying said defined region, means for coupling an optical beam to one end of said defined region, means for extracting an optical beam from the other end of said defined region, wherein said layer comprises an electro-optic material, and further including spaced-apart longitudinally extending electrodes deposited on the top surface of said layer on the respective sides of said single dielectric stripe element, and still further comprising an ambient medium in contact with any remaining portions of the top surface of said layer and in contact with the top surfaces of said stripe element and of said electrodes, the index of refraction of said single stripe element being greater than the index of refraction of said medium but less than the index of refraction of said layer.

2. A combination as in claim 1 further including means connected to said electrodes for establishing a variable electric field in said defined region.

* * * * *